United States Patent [19]

Kao et al.

[11] Patent Number: 5,302,476
[45] Date of Patent: Apr. 12, 1994

[54] HIGH PERFORMANCE POSITIVE ELECTRODE FOR A LEAD-ACID BATTERY

[75] Inventors: Wen-Hong Kao, Brown Deer; Norma K. Bullock, Pewaukee; Ralph A. Petersen, West Allis, all of Wis.

[73] Assignee: Globe-Union Inc., Milwaukee, Wis.

[21] Appl. No.: 624,720

[22] Filed: Dec. 3, 1990

[51] Int. Cl.$^5$ .............................. H01M 4/88
[52] U.S. Cl. ................. 429/228; 429/225; 429/227; 429/238
[58] Field of Search ............... 429/228, 227, 225, 238

[56] References Cited

U.S. PATENT DOCUMENTS

| | | |
|---|---|---|
| 1,572,586 | 2/1926 | Weir . |
| 2,159,226 | 1/1935 | Reid ..................... 429/227 |
| 2,182,479 | 12/1939 | Johnstone . |
| 3,169,890 | 2/1965 | Voss . |
| 3,194,685 | 7/1965 | Malloy . |
| 3,398,024 | 8/1968 | Barnes et al. . |
| 3,765,943 | 10/1973 | Biagetti . |
| 4,323,470 | 4/1982 | Mahato et al. ............... 429/225 |
| 4,326,017 | 4/1982 | Will ..................... 429/228 |
| 4,387,142 | 6/1983 | Lindholm et al. ............ 429/228 |
| 4,388,210 | 6/1983 | Parker .................... 429/228 |
| 4,415,410 | 11/1983 | Reich .................... 429/227 |
| 4,422,917 | 12/1983 | Hayfield . |
| 4,547,443 | 10/1985 | Rowlette et al. . |
| 4,656,706 | 4/1987 | Mahato et al. . |
| 5,096,611 | 3/1992 | Matthew et al. ............. 429/228 |

FOREIGN PATENT DOCUMENTS

| | | |
|---|---|---|
| 723018 | 10/1968 | France . |
| 0101773 | 6/1984 | Japan ..................... 429/228 |
| 8801559 | 5/1988 | Spain . |
| 1014694 | 12/1965 | United Kingdom ............ 429/227 |

OTHER PUBLICATIONS

Bell System Technical Journal, Sep., 1970, No. 49, pp. 1305-1319 Biagetti et al., "Tribasic Lead Sulfate as a Paste Material".

Yarnell and Weeks, J. Electrochem. Soc., No. 126, p. 7 (1979).

Primary Examiner—Olik Chaudhuri
Assistant Examiner—C. Everhart
Attorney, Agent, or Firm—Foley & Lardner

[57] ABSTRACT

An electrode suitable for use as a lead-acid battery plate is formed of a paste composition which enhances the performance of the plate. The paste composition includes a basic lead sulfate, a persulfate and water. The paste may also include lead oxide and fibers. An electrode according to the invention is characterized by good strength in combination with high power density, porosity and surface area.

18 Claims, No Drawings

HIGH PERFORMANCE POSITIVE ELECTRODE FOR A LEAD-ACID BATTERY

The invention described herein was made in the performance of work under NASA Contract Number NAS7-918 for design, fabrication, assembly and testing of high power bipolar lead-acid batteries, and is subject to the provisions of Section 305 of the National Aeronautics & Space Act of 1958 (42 U.S.C. 2457).

TECHNICAL FIELD

This invention relates generally to lead-acid battery electrodes, more particularly, to a high performance positive paste for making lead-acid battery electrodes.

BACKGROUND OF THE INVENTION

Conventional lead-acid batteries contain a positive electrode ($PbO_2$ plate) and a negative electrode (Pb plate) immersed in a sulfuric acid electrolyte and having a separator interposed therebetween. Such electrodes are typically made by applying a paste containing lead oxide(s) and lead sulfate(s) to the surface of a battery plate and electrochemically forming the paste into an active material.

Conventional pastes for use in making automotive batteries contain lead oxide (usually containing free lead in the range of 15 to 30% by weight), sulfuric acid, water and additives such as fiber and expanders. Such pastes are usually made by adding the sulfuric acid and water to a mixture of lead and lead oxide(s). As a result of the chemical reaction during mixing, a portion of the lead and PbO is initially converted to lead sulfate ($PbSO_4$) and the resultant positive paste comprises a heterogeneous mixture of lead, lead oxide, lead sulfate and/or basic lead sulfates.

According to one known process, the paste is made by first weighing out a predetermined amount of lead oxide into a weigh hopper and dumping the lead oxide into a batch mixer, such as a mulling mixer. Dry additives such as fiber are directly added to the mixer. The resulting mixture is dry mixed for several minutes so that the fiber is dispersed throughout the oxide. Water is then added as needed to make a paste of the desired consistency. The wet mixture is mixed for a short time to wet out the lead oxide. Sulfuric acid is then added as mixing continues until the temperature peaks. The resulting paste is then cooled by evaporation of water and conduction to the mass of the mixer.

As a means of improving the ease of manufacture of batteries, a variety of conductive additives have been proposed for incorporation into the plates. Lead dioxide has been proposed as an additive for paste mixtures containing tetrabasic lead sulfate. See, Reich, U.S. Pat. No. 4,415,410 issued Nov. 15, 1983. Lead dioxide enhances positive plate formation, but provides no substantial advantage in the resulting battery because it participates in the positive plate reaction. During charging of the battery, lead sulfate is converted into lead dioxide, and the reverse reaction occurs during discharge.

The use of pre-sulfated paste materials containing basic lead sulfate, e.g., tri- and tetrabasic lead sulfates ($3PbO \cdot PbSO_4 \cdot H_2O$ and $4PbO \cdot PbSO_4$) made in dry form prior to forming the paste has also been proposed to improve the efficiency of the paste. See Malloy, U.S. Pat. No. 3,194,685, issued Jul. 13, 1965; Johnstoner U.S. Pat. No. 2,182,479, issued Dec. 5, 1939; and, Weir, U.S. Pat. No. 1,572,586, issued Feb. 9, 1926. Monobasic lead sulfate has also been used as a pre-sulfated paste material. See, for example, Voss et al., U.S. Pat. No. 3,169,890, issued Feb. 16, 1965.

Biagetti, U.S. Pat. No. 3,765,943 emphasizes the advantages of preparing a tetrabasic lead sulfate from orthorhombic lead oxide. The lead oxide starting material is mixed with aqueous sulfuric acid so that the reaction is carried out in aqueous suspension. See also, Biagetti et al., *Bell System Technical Journal*, September 1970, No. 49, pp. 1305-1319, wherein the pastes are prediluted with water just prior to application to the cell grids. Positive plates prepared according to such a procedure generally exhibit good performance and cycle life. However, positive plates prepared from such pre-sulfated paste mixes are difficult to form and must usually be cured for at least 24 hours before being formed. See, for example, Yarnell and Weeks, *J. Electrochem. Soc.*, No. 126, p. 7 (1979).

Reacting lead oxide with ozone to form improved lead oxides useful as active materials in batteries is also known, as described in Parker, U.S. Pat. No. 4,388,210, issued Jun. 14, 1983, and Mahato et al., U.S. Pat. No. 4,656,706, issued Apr. 14, 1987. Parker also indicates that surface area increase is directly related to the presence of a hydrogen bonding solvent, typically water, for ozone, and that an increase in surface area is obtained with higher ozone concentration.

Metal oxides including titanium and tin oxides have also been suggested as additives for lead-acid battery plates. See, for example, Rowlette et al., U.S. Pat. No. 4,547,443, issued Oct. 15, 1985, and Hayfield, U.S. Pat. No. 4,422,917, issued Dec. 27, 1983. These additives have proven somewhat useful but fail to completely meet the need for a lead-acid battery paste capable of high performance.

Several attempts have also been made to improve the conductivity of the paste through use of persulfate treatments. For example, Reid, U.S. Pat. No. 2,159,226, issued May 23, 1939, discloses treating battery plates, before they are formed, with a persulfate by incorporating the persulfate into the paste or through use of a pickling step. When added to the paste, the persulfate is preferably incorporated into the paste and the pasted plate immersed in the solution containing the persulfate. When the persulfate treatment is performed by pickling, the plates containing lead oxide (PbO) and water may be dipped in a persulfate solution ranging from 1% up to a saturated solution. The reference specifically describes use of ammonium persulfate added in solid form to the lead oxide in preparation of the paste, or added as an aqueous solution of any strength up to a saturated solution.

Barnes et al., U.S. Pat. No. 3,398,024, issued Aug. 20, 1968, relates to the formation of a battery plate. Before the pasting operation, the grid is dipped in ammonium persulfate, sodium persulfate, or a sodium perborate solution.

Belgian Patent No. 723,018, issued Oct. 28, 1968, relates to another attempt to improve the efficiency of the charge of the positive plates by adding potassium persulfate to the mixture of lead oxide and water to prepare the active material. Particularly, this reference discloses forming a pasty mixture of lead oxide (PbO) and potassium persulfate ($K_2S_2O_8$) by mixing the two substances with water until the lead dioxide (formed by the reaction of the lead oxide and persulfate) is uniformly dispersed throughout the resultant mixture. The addition of 10.76% by weight of the persulfate to the lead oxide is specifically disclosed. The paste of that reference does not, however, have sufficient consistency and adherence of the paste to the grid is very poor. As a result, the active material tends to shed during the formation of the battery.

Another attempt to improve the efficiency of charge of the positive plates through persulfate treatments shown in Spanish Patent No. 8801559, issued May 10, 1988, which discloses the pre-treating of each positive plate, before the formation of the battery, with a solution which contains the persulfate anion in 20 to 80 g/l concentration. The reference suggests that the persulfate ion oxidizes the active materials of the plate ($PbSO_4$ and $PbO$) to conductive $PbO_2$, reducing the total charge time by up to 50%.

Such conventional batteries and improvements thereto in accordance with prior methods fail to produce batteries capable of high power outputs. In such batteries, the energy efficiency or capacity is limited to less than 50% of the theoretical value determined according to Faraday's law. This energy efficiency is even lower at high discharge rates. Therefore, conventional SLI batteries are incapable of delivering a high power output.

High power batteries as referred to herein are batteries capable of yielding a discharged power generally In excess of one (1) watt/cm$^2$. Such batteries are useful in applications where large amounts of power are needed in short periods of time, as is necessary in a number of aeronautical applications. While it has been suggested that high power levels can be obtained by increasing the porosity of the formed plate, high porosity weakens the plates. For example, once the porosity of conventional plates is increased to about 60%, the plate tends to lose its strength and cannot be effectively used in lead-acid batteries.

A positive paste material capable of forming a high porosity plate is thus desirable for high power output applications and heretofore has been unobtainable from the prior art teachings. The present invention addresses this problem. Particularly, the battery plates prepared in accordance with the present invention exhibit high porosity and surface area, as well as a high efficiency of formation. Such plates have good strength and are capable of high power outputs.

SUMMARY OF THE INVENTION

In a high-performance positive electrode of the invention including a conductive current collector and an active lead material in contact with the collector, the active material has enhanced porosity and surface area, and a power discharge of at least about 1 watt/cm2. According to a further aspect of the invention, the active material has a porosity of at least 55%, a surface area of at least 4 m$^2$/g, and enhanced active material utilization at current discharge levels higher than about 0.2 A/cm$^2$.

A high performance positive paste of the invention may be used to obtain an electrode having the foregoing characteristics. Such a paste consists essentially of a basic lead sulfate, a persulfate salt and sufficient amount of water to form a paste. The paste may also include a lead oxide compound. The paste compositions made according to the invention are useful in forming electrodes comprising a conductive current collector and an active lead material in contact with the collector. Electrodes according to the invention include lead-acid battery electrodes, such as plates, tubular electrodes or bipolar electrodes. The active material of such electrodes is formed from the high performance positive paste. The electrodes of the invention, when formed, are capable of yielding high power discharge, generally in excess of 1 watt/cm$^2$. Moreover, such electrodes of the invention have a high porosity, a high surface area and have good strength characteristics.

DETAILED DESCRIPTION OF THE PREFERRED EXEMPLARY EMBODIMENTS

A preferred high performance paste of the invention consists essentially of about 20 to 97.5 wt. % of the basic lead sulfate component; from about 2.5 to 25 wt. % of the persulfate salt; 0 to 55 wt. % lead oxide; 0 to 75 wt. % of a conductive additive other than lead oxide; and from about 10 to 30 wt. % water based on the combined weight of the solids. However, the invention further extends to other forms of paste mixtures, as exemplified in Example 5 below, wherein a basic lead sulfate and a persulfate are used in combination, the amount of the basic lead sulfate is at least 20 wt. %, and the amount of the persulfate is at least about 2.5 to 3 wt. %. The foregoing amount of basic lead sulfate is not present or formed in pastes made by known processes using lead oxide starting materials, such as described in Reid U.S. Pat. No. 2,159,226.

The basic lead sulfate component of the paste of the invention may include lead sulfate, monobasic lead sulfate, tribasic lead sulfate, tetrabasic lead sulfate and/or mixtures thereof. Each of these compounds can be prepared in accordance with methods known by and available to those skilled in the art. Preferably, the basic lead sulfate component of the paste of the invention comprises tribasic lead sulfate (3PbO.PbSO$_4$.H$_2$O), tetrabasic lead sulfate (4PbO.PbSO$_4$) or a mixture thereof. More preferably, the basic lead sulfate component includes from about zero to about 100% tribasic lead sulfate and from about zero to 75% tetrabasic-lead sulfate.

The persulfate component of the paste of the invention may be any suitable persulfate salt, such as sodium persulfate (Na$_2$S$_2$O$_8$), potassium persulfate (K$_2$S$_2$O$_8$), calcium (CaS$_2$O$_8$) or ammonium persulfate ((NH$_4$)$_2$S$_2$O$_8$). Other Group IA, IIA or metal persulfate salts may also be employed according to the invention.

The water component of the paste of the invention is preferably added to a dry mixture of the above components. Water is added in an amount effective to form a flowable paste. Preferably, water is added in an amount from about 5 to about 35%, more preferably 10 to about 30%, based on the weight of the solids. In any event, the amount of water should be sufficient for the persulfate reaction to take place. This reaction forms lead dioxide as follows:

$$2PbO + S_2O_8^{2-} \rightarrow PbO_2 + PbSO_4 + SO_4^{2-}$$

A plate provided with a paste formed with insufficient water is difficult to form. A plate provided with excess water, however, increases the difficulty of pasting because the paste tends not to adhere to the plate (electrode).

Optionally, the high performance paste of the invention may include a lead oxide component. Standard lead oxides (PbO, Pb$_3$O$_4$, etc.) may be employed. Preferably, the lead oxide component is selected from litharge, red lead, leady oxide or mixtures thereof. More preferably, the lead oxide component is o-PbO, t-PbO, or $Pb_3O_4$ in an amount from about 0 to about 55 wt. %. In a particularly preferred embodiment of the invention, the lead oxide component comprises o-PbO containing less than 20% free lead. Free lead levels greater than about 5 wt. % can strongly inhibit the persulfate reaction. Thus, use of leady oxides containing higher free lead contents generally requires use of additional persulfate salt.

Positive plates containing tetrabasic lead sulfate exhibit very good discharge capacity and cycle life when they are properly formed. However, such plates normally are very difficult to form especially when the tetrabasic lead sulfate containing plates are made using low free lead oxide. Incorporation of persulfate in accordance with the invention, however, tends to yield efficient high rate formations resulting in high performance positive plates even for plates made using tetrabasic lead sulfate. An electrode according to the invention made from a paste containing substantial amounts of tri- and/or tetrabasic lead sulfate will have a predominantly tri- or tetrabasic lead sulfate crystal structure with enhanced performance characteristics.

The paste of the invention may also include other additives such as carbon, fibers and conductive additives. Fibers may be used in the positive paste mixes of the invention as a binder to improve the handling characteristics of the battery plates after pasting. Suitable fibers include fiberglass, tin or tin dioxide-coated fiberglass, carbon fibers, synthetic plastic fibers such as modacrylic fibers and mixtures thereof. These fibers preferably have a fineness of about 3 denier and lengths in the range of ⅛ to 1/16 inch. Specific gravity of the preferred modacrylic fibers is in the range of about 1.2 to 1.5 g/$CM^3$. The fiber may be added directly to the paste of the invention in dry form, preferably in an amount from about 0.0 to about 0.4%, and more preferably from about 0.08 to about 0.1%.

Conductive additives may also be added directly to the paste of the invention. Useful conductive additives include carbon, conductive metal oxides including tin dioxide and titanium oxide, combinations thereof, and barium metaplumbate. Barium metaplumbate shows excellent stability in sulfuric acid and has a high oxygen overpotential such as is disclosed in U.S. Ser. No. 07/345,903 owned by the assignee of record. Additionally, electrically conductive transition metal oxides may be utilized, such as $TiO_{2-x}$, $WO_{3-x}$, $MoO_{3-x}$, $V_2O_{5-x}$ and $Nb_2O_{5-x}$ where x is greater than 0 and less than or equal to 1 as are disclosed in U.S. Ser. No. 07/426,580, also owned by the assignee of record. Such conductive additives generally are added in amounts ranging from about 0 to 75 wt. %, particularly 0.1 to 75% by weight, based on the solids present in the paste, and more preferably in an amount from 0.1 to 50 wt. %.

According to a preferred embodiment of the invention, the high performance paste consists essentially of from about 42 to about 51 wt. % o-PbO, from about 20 to 45 wt. % $3PbO.PbSO_4.H_2O$, from about 20 to 45 wt. % $4PbO.PbSO_4$, from about 2.5 to 10.0 wt. % of a persulfate salt, from about 0.08 to 0.1 wt. % glass fiber, and from about 10 to about 30% water based on the weight of the solids. A formed plate made with the preferred paste composition has been found to contain smaller $PbO_2$ agglomerates and larger macropores, as compared with other conventional plates. Higher plate porosity and surface area are thus achieved as is shown in Table I below, wherein TRLS = $3PbO.PbSO_4.H_2O$, TELS = $4PbO.PbSO_4$, PERS. = $K_2S_2O_8$, performance is normalized, and the amounts of each ingredient are in weight percent, with the amount of water being based on the total weight of the solids.

TABLE I

| o-PbO | TRLS | TELS | PERS. | $H_2O$ | Porosity (%) | Area ($m^2$/g) | Performance |
|---|---|---|---|---|---|---|---|
| 95.2 | 0 | 0 | 4.7 | 29.9 | 56.9 | 10.7 | 1.42 |
| 0 | 95.2 | 0 | 4.7 | 29.7 | 70.4 | 8.9 | 0.78 |
| 0 | 0 | 91.0 | 8.9 | 22.7 | 60.0 | 7.3 | 0.64 |
| 48.1 | 23.8 | 22.6 | 5.4 | 29.9 | 61.0 | 11.5 | 2.21 |
| 50.7 | 44.2 | 0 | 5.0 | 30.0 | 62.7 | 13.49 | 1.72 |

The high porosity and high surface area obtainable with the preferred paste composition are shown in the last two rows of Table I. Higher power outputs can thus be obtained when the plates of the invention are used in a lead-acid battery.

Battery plates used in lead-acid batteries according to the invention are made by any well-known process, for example, by applying the paste of the invention to the surface of a battery plate and forming the paste into an active material. Unlike conventional processes, sulfuric acid does not need to be added to the dry mixture to prepare the paste of the invention. Moreover, plates prepared using such a paste need not be subjected to conventional curing processes prior to being formed.

The paste is preferably prepared by first weighing out a predetermined amount of the basic lead sulfate and place it into a batch mixer, such as a mulling mixer. The persulfate component is then weighed out in a weigh hopper and added to the batch mixer. Dry additives such as lead oxide, fiber and the other conductive additives, described above, are then added directly to the mixer. The resulting composition is dry-mixed for several minutes so that the additives are completely mixed to form a powder or granular mixture. Water is then added in an amount effective to make a paste of the desired consistency.

The wet mixture is mixed for a short time and then applied to the surface of a current collector, such as a battery plate, grid or electrode. Such collectors can comprise lead, or lead alloys such as lead-antimony, lead-calcium or the like. The electrode is then air dried prior to formation. No specific curing procedure is necessary.

Electrode formation may be carried out by any conventional process. Preferably, the electrode is formed in excess sulfuric acid by passing a constant current through the electrode for a sufficient period of time. According to a preferred embodiment, the sulfuric acid used to form the electrodes has a specific gravity in the range of about 1.2 to 1.3, and a current of 13.75 to 27.5 amp/lb. paste material and current is passed through the electrode for about 6 to about 8 hours. Generally, each positive electrode is sandwiched by two negative electrodes during formation, and the current is controlled so that total input capacity is in the range of about 110 to 165A.H/lb. of the paste material.

Other methods of making positive lead-acid battery electrodes may be employed. For example, the tubular electrode process commonly used in the manufacture of traction and stationary batteries may be utilized. In this process, a tube is constructed from woven, braided or felt polyester, glass or other sulfuric acid and oxygen-resistant fibers. The tube is shaped in suitable solution under thermal treatment. The current collector (the spine) is a hard lead rod centered in each tube by, for example, star protrusions. The tube is pulled over the spines and then filled with the paste material of the invention in either a powder or slurry form. Following the tube filling process, the tubular electrode may be immersed in sulfuric acid for formation.

The paste materials according to the invention can also be used as filler materials in a bipolar electrode substrate for a bipolar lead-acid battery, for example, of the type described in Biddick, U.S. Pat. No. 4,098,967 or Poe, U.S. Pat. No. 3,795,543, the entire contents of which patents are incorporated herein by reference.

The pastes of the present invention, when used to form electrodes for lead-acid batteries, yield high performance. Such electrodes in the form of positive plates have high porosity and surface area while retaining the good strength characteristics of conventional battery plates. Particularly, battery electrodes made in accordance with the invention preferably have porosity levels which meet or exceed the levels of standard SLI batteries, i.e., in excess of about 55 to 60%. Preferably, the porosity of a positive electrode of the invention is in the range of about 55 to 70%, more preferably 60 to 68%. These plates also have high surface area, preferably in the range of about 4 to 14 $m^2/g$, especially about 7 to 14 $m^2/g$. These plates also possess good strength characteristics comparable to those possessed by conventional plates. In particular, vibration of the battery plates of the invention on a platform vibrating at a frequency of about 60 Hz and an amplitude of about 0.12 inches for 3 minutes results in a weight loss of less than 1%.

The invention is further described by the following examples, wherein amounts are given in weight percent unless otherwise specified:

EXAMPLE 1 (COMPARISON)

Conventional positive lead-acid battery plates were prepared by applying a paste containing 78.35% by weight leady oxide (t-PbO), 0.05% glass fiber, 8.80% sulfuric acid (having a specific gravity of 1.325), and 12.80% water. The leady oxide contained free lead in the range of 15 to 30% by weight of the leady oxide. The paste was prepared in accordance with conventional batch procedures such as described above. The paste was then applied to lead-alloy grids having a size of about 5.2 cm×4.2 cm×0.12 cm. The plates were then cured by heating in a chamber having a temperature of about 130° F. and a humidity of about 95% for approximately 24 hours.

The cured plates were then formed in excess sulfuric acid having a specific gravity of 1.245. Formation was achieved by passing a constant current through the plates for 8 hours. Each positive plate was sandwiched between two negative plates during formation. The current was controlled so that total input capacity was in the range of about 165A.H/lb. of positive material.

The formed plates were then discharged in sulfuric acid having a specific gravity of 1.305 at various current densities to predetermined cut-off voltages. The discharge capacity was determined by multiplying the discharge time by the discharge current. The ratio of the discharge capacity to the theoretical capacity of the plate, calculated using Faraday's law based on the weight of active material in the paste, was determined and served as a measure of utilization of active material. The results of the various discharge tests are summarized in Table II.

TABLE II

| Discharge Current ($A/cm^2$) | Cut-Off Voltage (V) | Utilization (%) |
| --- | --- | --- |
| 0.945 | 0.50 | 9.8 |
| 0.473 | 0.50 | 14.7 |
| 0.234 | 1.00 | 18.4 |
| 0.013 | 1.75 | 53.2 |

EXAMPLE 2 (INVENTION)

A solid mix containing 44.2 wt. % tribasic lead sulfate and 5.0 wt. % potassium persulfate was prepared. To this composition 50.7 wt. % orthorhombic lead oxide (o-PbO) and 0.1 wt. % glass fiber (0.125 inches, 3 denier) were added. Water in an amount of 30% of the solid mix weight was added periodically. No acid was added to the mixture. The water and solids were thoroughly mixed until a pastable mixture was formed. The paste was then applied to grids of the same size as described in Example 1. The plates were then air dried. No curing procedure was used. Once dry, the plates were formed in the same manner as were the conventional plates described in Example 1.

The formed plates were then transferred to sulfuric acid having a specific gravity of 1.305 and discharged at various current densities to given cut-off voltages in the same manner as in Example 1. The percent utilizations determined are shown in Table III below.

TABLE III

| Discharge Current ($A/cm^2$) | Cut-Off Voltage (V) | Utilization (%) |
| --- | --- | --- |
| 0.945 | 0.50 | 16.9 |
| 0.473 | 0.50 | 18.8 |
| 0.234 | 1.00 | 27.2 |
| 0.013 | 1.75 | 55.0 |

The results shown in Table II indicate that the positive plates prepared in accordance with the invention are capable of higher discharge rates. Current densities greater than 0.2 $A/cm^2$ show 25 to 70% greater utilizations than observed with the conventional plates of Example 1.

EXAMPLE 3 (INVENTION)

A solid mix containing 23.8 wt. % tribasic lead sulfate, 22.6 wt. % tetrabasic lead sulfate and 5.4 wt. % potassium persulfate was prepared. To this composition 48.1 wt. % orthorhombic lead oxide (o-PbO) and 0.1 wt. % glass fiber (0.125 inches, 3 denier) were added. Water in an amount of about 30% of the solid mix weight was added periodically to the mixture to make a paste. No acid was added. The water and solids were thoroughly mixed until a pastable mixture was formed. This paste was then applied to grids of the size described in Example 1. The plates, once pasted, were air dried. The plates were formed as in Example 1, however, no curing procedure was carried out for the plates of this example.

The formed plates were then transferred to sulfuric acid having a specific gravity of 1.305 and discharged at various current densities to given cut-off voltages. The percent utilization, as described in Example 1, was determined for each of the discharge tests as shown in Table IV below.

TABLE IV

| Discharge Current ($A/cm^2$) | Cut-Off Voltage (V) | Utilization (%) |
| --- | --- | --- |
| 0.945 | 0.50 | 21.7 |
| 0.473 | 0.50 | 28.8 |
| 0.234 | 1.00 | 30.3 |
| 0.013 | 1.75 | 50.0 |

As Table III shows, the pastes of the present invention are capable of high rate performance at 60 to 120% better utilizations than the conventional plates of the Example 1. Performance at low discharge rates, however, was similar to that observed with conventional positive plates.

EXAMPLE 4 (INVENTION)

Various plates of the invention having different compositions were prepared in the same manner as the plates of Example 2. These plates were then discharged at a current density of 0.945 $A/cm^2$ to a cut-off voltage of 0.50 V to determine utilization. This utilization was then normalized to that of the conventional plates of Example 1, i.e., the utilization obtained for the plates of the invention was divided by the utilization obtained for the conventional plates of Example 1, to evaluate the performance of the plates of the invention. The various compositions and performances are reported in Table IV below. In Tables V and VI, TRLS=$3PbO \cdot PbSO_4 \cdot H_2O$, TELS=$4PbO \cdot PbSO_4$, PERS.=$K_2S_2O_8$, performance is normalized, and the amounts for each ingredient are in weight percent, with the amount of water being based on the solids.

TABLE V

| Plate | TRLS | TELS | PERS. | 0-PbO | Fiber | Water | Performance |
| --- | --- | --- | --- | --- | --- | --- | --- |
| A | 90.9 | 0.0 | 9.0 | 0.0 | 0.1 | 28.4 | 1.52 |
| B | 0.0 | 64.4 | 10.0 | 25.5 | 0.1 | 22.1 | 1.10 |
| C | 45.6 | 44.0 | 10.3 | 0.0 | 0.1 | 32.8 | 2.08 |
| D | 42.1 | 0.0 | 9.5 | 48.3 | 0.1 | 30.2 | 1.35 |
| E | 22.3 | 21.5 | 5.0 | 51.1 | 0.1 | 10.0 | 1.55 |

As is clear from the results above, the plates of the invention are superior to conventional plates, their performance being from about 1.1 to 2.1 times better than conventional plates.

EXAMPLE 5 (INVENTION)

A paste the same as that described in Example 1 was prepared, but this time adding 10% by weight $K_2S_2O_8$. Plates containing this paste were then prepared, cured and formed. Thereafter, discharge tests at a current density of 0.934 $A/cm^2$ to a cut-off voltage of 0.50 V were performed. The plate with the addition of persulfate showed 82.6% higher capacity than the conventional plate not containing persulfate. The presence of additional additives did not inhibit performance of the pasted plates.

EXAMPLE 6 (INVENTION)

Plates similar to Plate C of Example 4 were prepared, but using a paste having varying amounts and forms of the persulfate component. In each instance, the plates were prepared and formed in the same way as in the foregoing examples. Discharge tests were performed and the utilizations obtained were normalized, as described in Example 4, to determine the performance of the plates. The various compositions of the pastes and the plate performances observed are provided in Table VI.

TABLE VI

| Plate | TRLS | TELS | PERS. | Fiber | Water | Performance |
| --- | --- | --- | --- | --- | --- | --- |
| F | 49.6 | 47.8 | 2.4 $K_2S_2O_8$ | 0.1 | 23.8 | 0.94 |
| G | 48.4 | 46.7 | 4.8 $Na_2S_2O_8$ | 0.1 | 23.2 | 1.67 |
| H | 48.4 | 46.7 | 4.8 $(NH_4)_2S_2O_8$ | 0.1 | 23.2 | 2.05 |

The results of this example demonstrate that the cation of the persulfate component does not play a role in the performance enhancement of the pastes of the invention. Additionally, it can be seen that a sufficient amount of the Persulfate component is necessary to achieve performance enhancement.

EXAMPLE 7

The plates of Example 2 and plates C and D of Example 4 were tested using a Syntron Jogger (FMC Corporation, Philadelphia, Pa.) to determine their strength. The Jogger was set to vibrate at a high frequency of about 60 Hz at its full strength (about 100 watts). The vibration amplitude was about 0.12 inches. Each of the plates was placed on the Jogger platform and permitted to bounce up and down on the platform for one minute. The weight difference of the plate before and after being placed on the Jogger was measured and the percent weight loss was determined ($\Delta W@1$ min.). The plates were then placed back on the Jogger for two More minutes, permitted to bounce up and down on the platform of the Jogger, and again the percent weight loss was determined ($\Delta W@3$ min.). The results are summarized in Table VII.

TABLE VII

| Plate | $\Delta W$ @ 1 min. (%) | $\Delta W$ @ 3 min. (%) |
| --- | --- | --- |
| Example 2 | 0.13 | 0.52 |
| Example 4-C | 0.30 | 0.65 |
| Example 4-D | 0.00 | 0.54 |

A weight loss after 3 minutes vibration at the aforementioned rate of less than 1% indicates a strong plate. The results show that the paste of the invention Yields plates having good strength.

EXAMPLE 8

The conventional plate of Example 1 and the plates prepared according to the invention as described in Examples 2 and 3 were tested for cycle life using a conventional cycle test methodology. The plates were first discharged with a current density of 0.945 A/cm$^2$ to a cut-off voltage of 0.5 V, and then recharged for two hours. The recharge current was controlled so that the total recharge capacity was 10% more than the discharge capacity. The discharge/recharge cycle was repeated until the utilization Of Positive active material became less than 5%. It was determined that the service life, i.e., the cycle life, of each of the plates was roughly the same. In particular, the cycle numbers for each of the plates were found to be 26, 28 and 22 for each of the plates of Examples 1, 2 and 3, respectively.

It will be understood that the above description is of preferred exemplary embodiments of the invention, and that the invention is not limited to the specific forms shown. Modifications may be made in the specific arrangements described herein without departing from the scope Of the present invention as expressed in the appended claims. For example, while the invention has been described in conjunction with lead-acid batteries formed of plates, the pastes of the invention can be applied to lead-acid batteries of various battery designs, including without limitation, tubular, bipolar, monopolar and hybrid designs to provide high performance batteries.

We claim:

1. In a positive lead-acid battery electrode including a conductive current collector and an active lead material in contact with said collector, the active lead material consisting essentially of lead dioxide which is converted to a lead sulfate upon discharge, the improvement wherein the positive electrode is made by a method comprising:
   combining a basic lead sulfate or lead oxide with a persulfate salt to form a dry mixture;
   then combining water with said mixture to form a paste;
   applying the paste to a conductive support; and
   forming the pasted support into an electrode containing active lead material having a porosity in the range of about 55% to 70% and a surface area of at least 4 m$^2$/g, and has sufficient strength to maintain its structure when assembled and used in a lead-acid battery.

2. The electrode of claim 1, wherein the electrode has a power discharge of at least about 1 watt/cm$^2$, and enhanced active material utilization at current discharge levels higher than about 0.2 A/cm$^2$.

3. The electrode of claim 1, wherein the surface area is in the range of 4 to 14 m$^2$/g.

4. The electrode of claim 3, wherein the dry mixture consists essentially of particles of about 20 to 97.5 wt. % of a basic lead sulfate, 3 to 25 wt. % of a persulfate salt, 0 to 75 wt. % of a conductive metal oxide other than lead oxide, and 0 to 55 wt. % of a lead oxide; and
   the porosity of the active material is in the range of 60 to 68% and the surface area of the active material is in the range of 7 to 14 m$^2$/g, the active material of said electrode has a predominantly tri- or tetrabasic lead sulfate crystal structure, and the electrode is a plate comprising a lead alloy grid having the active material deposited thereon, the plate having a weight loss of about 1% or less when placed on a platform vibrating at about 60 Hz with about a 0.12 inch amplitude for 3 minutes.

5. The electrode of claim 1, wherein the porosity is in the range of 60 to 68% and the surface area is in the range of 7 to 14 m$^2$/g.

6. The electrode of claim 2, wherein utilization is at least about 11% at a discharge current of 0.945 A/cm$^2$ and a cut-off voltage of 0.5 V.

7. The electrode of claim 2, wherein utilization is at least about 16% at a discharge current of 0.945 A/cm$^2$ and a cut-off voltage of 0.5 V, at least about 18% at a discharge current of 0.473 A/cm$^2$ and a cut-off voltage of 0.5 V and at least about 27% at a discharge current of 0.473 A/cm$^2$ and a cut-off voltage of 1.0 V.

8. The electrode of claim 1, wherein said electrode is formed from a paste consisting essentially of about 20 to 97.5 wt. % of one or more basic lead sulfates, 2.5 to 25 wt. % of a persulfate salt, 0 to 75 wt. % of a conductive metal oxide other than lead oxide, and 0 to 55 wt. % of a lead oxide, as solids, and 10 to 30 wt. % of water based on the solids.

9. The electrode of claim 1, wherein the active material of said electrode has a predominantly tri- or tetrabasic lead sulfate crystal structure.

10. The electrode of claim 1, wherein said electrode is a plate comprising a lead alloy grid having the active material deposited thereon, said plate having weight loss of about 1% or less when placed on a platform vibrating at about 60 Hz with about a 0.12 inch amplitude for 3 minutes.

11. The electrode of claim 1, wherein said electrode is a tubular electrode.

12. A paste mixture for use in making positive electrodes for lead-acid batteries, consisting essentially of particles of about 20 to 97.5 wt. % of a basic lead sulfate, 2.5 to 25 wt. % of a persulfate salt, 0 to 75 wt. % of a conductive metal oxide other than lead oxide, and 0 to 55 wt. % of a lead oxide, said particles being dispersed in an amount of water effective to form a paste, the paste mixture being substantially free of sulfuric acid.

13. The paste mixture of claim 12, wherein the amount of water is from about 10 to 30% based on the solids.

14. The paste mixture of claim 13, wherein said basic lead sulfate comprises tribasic lead sulfate, tetrabasic lead sulfate, or a mixture thereof.

15. The paste mixture of claim 14, wherein said lead oxide consists essentially of o-PbO having a free lead content of less than about 5 wt. %.

16. The paste of claim 15, wherein said paste further contains about 0.01 to 0.4 wt. % fibers.

17. The paste of claim 12, consisting essentially of about 42 to 51 wt. % o-PbO, from about 20 to 45 wt. % 3PbO.PbSO$_4$.H$_2$O, from about 20 to 45 wt. % 4PbO.PbSO$_4$, from about 2.5 to 10.0 wt. % of a persulfate salt, from about 0.08 to 0.1 wt. % glass fibers, and from about 10 to 30% water based on the weight of the solids.

18. A lead-acid battery containing one or more positive electrodes as claimed in claim 1.

* * * * *